Patented Aug. 18, 1925.

1,550,009

UNITED STATES PATENT OFFICE.

JESSE R. CLAWSON, OF DELPHI, INDIANA.

NONFREEZING MOTOR-COOLING COMPOSITION.

No Drawing.   Application filed December 30, 1922. Serial No. 610,027.

*To all whom it may concern:*

Be it known that I, JESSE R. CLAWSON, a citizen of the United States, residing at Delphi, in the county of Carroll and State of Indiana, have invented a new and useful Nonfreezing Motor-Cooling Composition, of which the following is a specification.

This invention relates to a liquid composition that is useful in the cooling systems of water-cooled motor-vehicle engines of the internal-combustion type, and which may be used in hot water heating systems and various circulatory systems, conduits and receptacles, the invention having reference more particularly to a liquid composition having a high boiling point and a low freezing point.

An object of the invention is to provide a liquid composition that shall be so constituted as to be adapted for conducting and distributing heat from engine cylinders, or from chambers, receptacles or conduits, and be adapted to be modified so as to vary the freezing point of the composition, as when required to be used in an extremely cold climatic temperature, or in a moderately cold climate.

Another object is the production of a liquid composition of such character as to be especially adapted for use in internal-combustion engine cooling systems, particularly in the winter season, and which shall not be liable to be frozen during inactivity when the engine is not in operation and is exposed to a low temperature, an aim being to avoid damage and expense caused by the freezing of water in such cooling systems.

A further object is to provide a liquid cooling composition of the above-mentioned character which shall not be injurious to metals or substances with which it may have contact, but shall tend to render metals rust-proof and non-corrosive with resultant increase in durability and economy in the use of the engine cooling systems, or other circulatory systems to which the composition is applicable.

With the above-mentioned and other objects in view, my invention consists in a composition essentially comprising water, calcium chloride, and a composition of organic matter; or more particularly comprising a mixture of water, preferably distilled or "soft" water; starchy matter, such as potato flour; tannin, the commercial quality; calcium chloride; and preferably fatty oil.

In preparing the composition, a vegetable composition is preferably produced separately, and I prefer to use as the ingredients thereof these substances in about the following proportions:—water, 35.1%; starchy matter, 35%; vegetable oil, or permissibly animal oil, 19.9%; and tannin, 10%. The water should be hot, or warm, when the other elements are mixed therewith. The oil may in some cases be omitted when this element of the composition is not needed for lubrication or for assisting in loosening scale in a circulatory system.

My composition is completed for use by mixing the vegetable composition and 75% of calcium chloride with water at a temperature of about 195 deg., Fah., and I prefer to use about 5 pounds of the vegetable compound and about 2,000 pounds of the calcium chloride, or in equivalent proportions, with a quantity of water sufficient to obtain the density necessary to prevent freezing, being about five hundred gallons of water with the other elements in the proportions mentioned above to enable the composition to remain in a liquid state in a zero temperature; greater density of the composition being necessary when it is to be exposed or subjected to lower temperatures.

In the composition which for convenience I have designated as vegetable, preferably prepared separately, the starchy matter may consist of various substances, such as potato flour which I prefer, its purpose being to counteract the tendency of the final composition (if starch were absent) to seep through minor cracks or loose pipe connections; another purpose of the starch being to assist the tannin in removing lime scale and preventing formation of scale. The purpose of the tannin is to loosen and dissolve lime scale in circulatory systems. The oil, when used in the composition, is for the purpose of supplying lubricating qualities thereto whereby to prevent rust and increase the durability of all metallic surfaces and packings with which the composition comes into contact.

To insure mixing of the oil with the water, the water if not soft is softened by inorganic chemicals, as lime and soda ash and is purified, after which it is drawn off into a wooden tank and there heated to about 195 degrees, Fah., the vegetable composition specified above being then added and mixed with the water. This solution is then agitated while the required amount of calcium chloride is added and until the latter is thoroughly dissolved, the impurities that may arise being skimmed off.

For making approximately 1000 gallons of the complete composition, as an example, with a freezing point of 15 degrees below zero, Fah., use 730 gallons of water, 2000 lbs. of calcium chloride, and two to five lbs. of the vegetable composition composed of the starchy matter, the tannin, the fatty oil, and sufficient water to permit a thorough mixing of the other ingredients of this composition.

My composition in practical use is of such efficiency as to meet the requirements, particularly in winter seasons, of all water-cooled internal-combustion engine cooling systems, and hot-water heating plants especially when not in operation in a freezing temperature; all metallic surfaces, packings, etc., with which the composition comes in contact being lubricated and their durability thereby increased; the composition will dissolve lime scale that may have formed and prevent further formation of the scale; and the composition possesses all the desired properties of a non-freezing radiator solution, and a valuable liquid circulating medium in various other systems where the qualities above-mentioned may be desired.

I claim:

1. A liquid composition of matter comprising water, calcium chloride, starchy matter, and tannin.

2. A liquid composition of matter comprising water, calcium chloride, starchy matter, tannin, and oil.

3. A liquid composition of matter comprising water, calcium chloride, and a vegetable composition having starch and tannin therein.

4. A liquid composition of matter comprising water, calcium chloride, and a vegetable composition having starchy matter, tannin, and oil therein.

5. A liquid composition of matter comprising a quantity of calcium chloride; also in addition about 35.1 per cent of water; about 35 per cent of starchy matter; about 19.9 per cent of oil; and about 10 per cent of tannin, in each total of 100 parts, by measure.

6. A liquid motor-cooling composition comprising proportionately about two thousand pounds of 75% calcium chloride; a vegetable composition consisting of about 35.1 per cent of water, about 35 per cent of starchy matter, about 19.9 per cent of vegetable oil, and about 10 per cent of tannin, in each total of 100 parts by measure; and about 730 gallons of water to acquire the necessary density to prevent freezing of the composition in the lowest temperature to which the composition is to be subjected.

In testimony whereof, I affix my signature on the 22nd day of December 1922.

JESSE R. CLAWSON.